July 4, 1967   D. W. HEWIE   3,329,837
SILICON CONTROLLED RECTIFIER CIRCUITS
Filed Jan. 20, 1966

Inventor
DAVID W. HEWIE
by: Agent

United States Patent Office 3,329,837
Patented July 4, 1967

3,329,837
SILICON CONTROLLED RECTIFIER CIRCUITS
David W. Hewie, Kitchener, Ontario, Canada, assignor to Dominion Electrohome Industries Limited, Kitchener, Ontario, Canada
Filed Jan. 20, 1966, Ser. No. 521,993
10 Claims. (Cl. 307—88.5)

ABSTRACT OF THE DISCLOSURE

The supply of current to a load is controlled by a trigger circuit for an SCR. The trigger circuit includes a 180° phase shift network, a clipping network that clips the output signal from the phase shift network, and a network that differentiates the clipped output signal, blocks negative-going pulses and supplies a differentiated signal having positive-going pulses to the gate electrode of the SCR.

Figure 1:
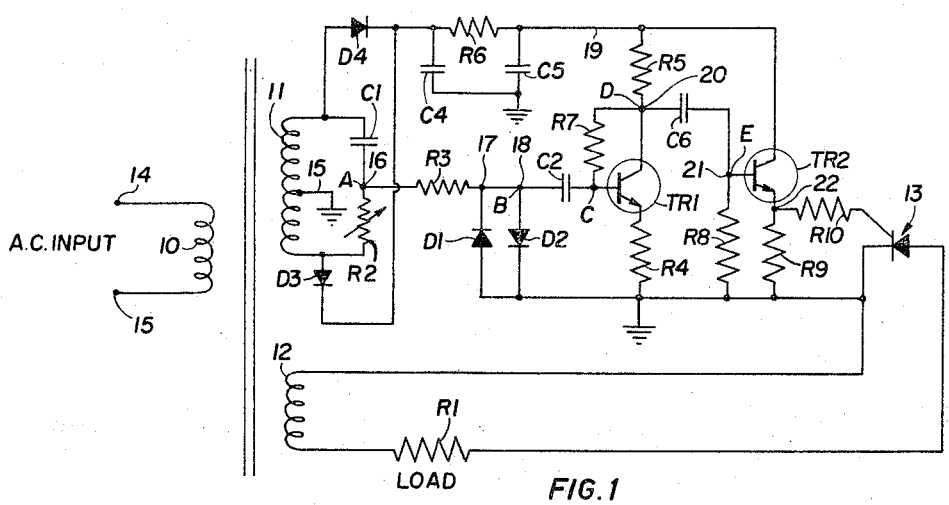
Figure 2:
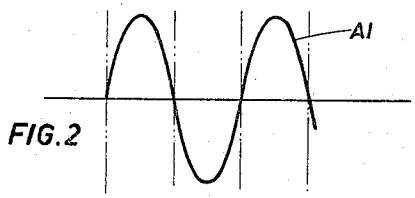

This invention relates to circuits including a silicon controlled rectifier and which are designed to supply a variable, i.e., controllable D.C. current to a load.

Many silicon controlled rectifier (SCR) circuits now in use employ trigger circuits that rely on variable voltage per se, or on a combination of variable voltage and phase shift, as the means of control, the control signal being derived from the main SCR supply. One disadvantage of the former type of trigger circuit is that control of the input signal to the SCR is possible only from 0° to 90°. With the latter type of circuit there is an improvement in this respect and control of the input signal from 0° to about 180° is possible, but it is difficult to obtain full 180° control with many known SCR trigger circuits that rely on both variable voltage and phase shift as the means of control. Furthermore, many such trigger circuits are sensitive to line voltage changes. When such line voltage sensitive trigger circuits are used, a change in line voltage will cause an effective phase shift of the trigger point, resulting in an undesired load voltage change.

Another disadvantage of many trigger circuits that use phase shift to control SCR's is their sensitivity to temperature variations. As is well known, the voltage sensitivity of the gate electrode of an SCR increases significantly with increasing temperature, and unless the trigger circuit is designed to compensate for this change, improper triggering and an undesired change in load voltage can occur.

In accordance with this invention, new and improved trigger circuits for an SCR are provided which permit accurate and full 180° phase control to be obtained and which are characterized by a low sensitivity to line voltage changes. A circuit embodying this invention also is designed to minimize operating changes caused by temperature variations.

In brief, in accordance with this invention there is provided a silicon controlled rectifier circuit that includes a transformer having a primary winding and a secondary winding, a silicon controlled rectifier having anode, cathode and gate electrodes, a load to which a controllable current is to be supplied, and a trigger circuit that includes the secondary winding. The load is connected to the silicon controlled rectifier. Means are provided for supplying A.C. voltage to the silicon controlled rectifier in phase lock with the A.C. voltage developed across the secondary winding when the primary winding is connected to an A.C. power source.

The trigger circuit comprises a phase shift network that produces an output signal which is shiftable in phase by 180° and which has positive and negative pulses thereof on both sides respetively of a reference axis. The phase shift network includes the aforementioned secondary winding. The trigger circuit also includes a clipping network for clipping the positive and negative-going peaks of the output signal from the phase shift network to produce a clipped output signal. The clipping network has an input terminal and an output terminal, and means are provided connecting the phase shift network for supply of its output signal to the input terminal of the clipping network. The trigger circuit further includes a network connected between the output terminal of the clipping network and the gate electrode of the SCR for differentiating the clipped output signal, blocking negative going pulses from the gate electrode, and supplying a differentiated signal having positive-going trigger pulses to the gate electrode.

This invention will become more apparent from the following detailed description, taken in conjunction with the appended drawings, in which:

FIGURE 1 is a circuit diagram showing an SCR circuit that constitutes a preferred embodiment of this invention, and FIGURES 2 to 6 inclusive illustrate waveforms at various points in the circuit of FIGURE 1.

Referring to FIGURE 1, there is shown a transformer having a primary winding 10 and two secondary windings 11 and 12. Both secondary windings are wound on the same core to maintain voltage phase lock.

It should be appreciated that the provision of two secondary windings, and the locating of both windings on the same core are not essential to this invention. What is important, however, is that the voltage across secondary winding 11 be in phase lock with the SCR supply voltage. If desired, secondary winding 12 could be omitted and the SCR supply voltage taken directly across primary winding 10. Where the term "phase lock" is used herein, this refers to the voltage across secondary winding 11 being in phase or 180° out of phase with the SCR supply voltage.

Connected in series with secondary winding 12 is a load, the load, in the present instance, being represented by a resistor R1. An SCR13 having anode, cathode and gate electrodes conventionally represented is provided, and the series circuit consisting of secondary winding 12 and resistor R1 is connected between the anode and cathode of the SCR.

Primary winding 10 has its input terminals 14 and 15 connected to any suitable A.C. source (not shown). A.C. power is supplied to SCR 13 from this source via primary winding 10 and secondary winding 12. If, during the half cycle that the anode of the SCR is positive relative to the cathode thereof, the gate electrode of the SCR receives no positive-going pulse from the trigger circuit connected thereto, and which will be described in detail hereinafter, SCR 13 will act as an open switch, and no voltage will be developed across load resistor R1. On the other hand, if at any time when the anode of SCR 13 is positive relative to its cathode, a positive-going pulse sufficient to trigger the SCR is applied to its gate electrode, the SCR will conduct for the remainder of the half cycle, and a D.C. voltage will be developed across load resistor R1. By varying the point in the half cycle where the SCR is triggered, the magnitude of the load voltage may be controlled, all as well known in the art.

A trigger circuit embodying this invention includes a phase shift network, a clipping network and a differentiating network, and a preferred embodiment illustrated in FIGURE 1 now will be described.

A phase shift network composed of secondary winding 11, a variable resistor R2 and a capacitor C1 is provided. Secondary winding 11 has a centre tap 15, and this is connected to a source of reference potential (ground). Capacitor C1 and resistor R2 are connected in series with each other, this series circuit being connected across secondary winding 11. The junction of capacitor C1 and resistor R2 constitutes the output terminal 16 of the phase shift network.

Those skilled in the art will appreciate that by varying the resistance of resistor R2, a shift in the phase of the output signal from the phase shift network appearing at output terminal 16 will be obtained, and that the phase of this output signal can be shifted 180° as resistor R2 is varied from zero resistance to a maximum resistance (the maximum resistance of resistor R2 should be considerably greater than the impedance of capacitor C1 at the operating frequency).

Output terminal 16 of the phase shift network is connected via resistor R3 to the input terminal 17 of a clipping network that consists of two diodes D1 and D2 connected with opposite polarity in full wave rectifier configuration between ground and input terminal 17. Diodes D1 and D2 preferably should be silicon diodes, since the use of such diodes will result in an output signal from the clipping network having a larger peak-to-peak amplitude than would be the case if germanium diodes were employed.

The output signal from the clipping network which appears at the output terminal 18 thereof is supplied to the input terminal of a differentiating circuit that consists of a capacitor C2 and the input resistance of a transistor TR1. Capacitor C2 is connected between output terminal 18 and the base electrode of transistor TR1. A resistor R4 is connected between ground and the emitter electrode of the transistor. A load resistor R5 is connected between the collector electrode of transistor TR1 and a conductor 19 carrying a positive D.C. potential (B+). B+ can be derived conveniently using the full wave rectifier circuit consisting of diodes D3 and D4 and the filter network consisting of capacitors C4 and C5 and resistor R6, or it may be obtained from some other source. A biasing resistor R7 is connected between the collector and base electrodes of transistor TR1.

The output terminal 20 of the differentiating network is connected to the input terminal of a second differentiating network composed of a capacitor C6 and a resistor R8. One terminal of resistor R8 is grounded, while the junction of resistor R8 and capacitor C6, which constitutes the output terminal 21 of the second differentiating network, is connected to the base electrode of a transistor TR2 connected in emitter follower configuration with the collector electrode thereof connected to B+ and a load resistor R9 connected between the emitter electrode of the transistor and ground.

The output terminal 22 of the emitter follower amplifier is connected via a resistor R10 to the gate electrode of SCR 13.

The operation of the trigger circuit now will be described with reference to FIGURE 1 and to FIGURES 2 to 6 which show the waveforms of the signals that appear at points A, B, C, D and E respectively in FIGURE 1.

Assuming that input terminals 14 and 15 of primary winding 10 are connected to an A.C. source such as a power line, a signal A1 (FIGURE 2) will be obtained at point A (output terminal 16), and, as explained hereinbefore, signal A1 may be shifted 180° in phase by varying resistor R2. The phase shift of signal A1 determines the point when SCR 13 is triggered and thereby controls, over a full 180° range, the magnitude of the voltage developed across load resistor R1.

Figure 3:
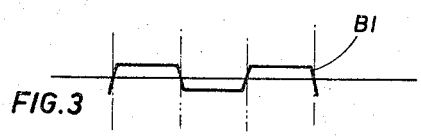
Figure 4:
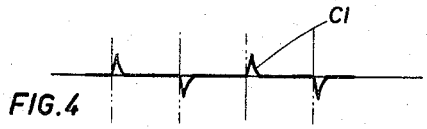
Figure 5:
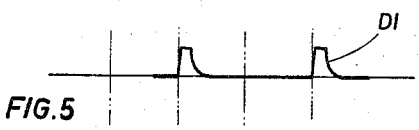
Figure 6:
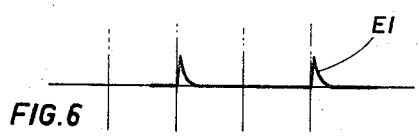

Signal A1 is supplied to the clipping circuit and is clipped, appearing at point B as the waveform B1 (FIGURE 3). The peak-to-peak amplitude of waveform B1 may be of the order of 1.2 volts, if diodes D1 and D2 are silicon diodes. By virtue of the clipping action, only the portion of signal A1 near the zero voltage axis is supplied to the differentiating network, and this materially reduces the sensitivity of the trigger circuit to line voltage changes. Moreover, by selecting only the portion of signal A1 near the zero axis, pulse generation is simplified, since the portions of waveform B1 that cross the zero axis in a region close to this axis are relatively steep. Even steeper rise times for a fixed pulse height can be obtained by increasing the amplitude of signal A1 by increasing the turns of secondary winding 11.

The first differentiating network generates the waveform C1 (FIGURE 4) consisting of alternate positive-going and negative-going pulses by differentiation of waveform B1. Transistor TR1 is biased so that only the negative-going pulses of waveform C1 are amplified by the transistor to produce an output signal D1 (FIGURE 5) at point D. It will be seen from a comparison of FIGURES 4 and 5 that the signal amplified by transistor TR1 is severely clipped (transistor TR1 is cut-off at the peaks of waveform D1). This is advantageous, since the rise time of the pulses in waveform D1 will be greater than the rise time of the pulses in waveform C1.

While waveform D1 could be applied directly to the gate electrode of SCR 13, i tis preferred to tailor the triggering pulses to minimize heating of the gate electrode and yet still provide sufficient trigger power. This is achieved by further differentiation in the second differentiating network, which has the effect of decreasing the fall off of the pulses shown in waveform D1 and producing the waveform E1 which has narrower pulses than the pulses in waveform D1.

Transistor TR2 connected in emitter follower configuration provides a desirable low impedance drive for the gate electrode of SCR 13. Of course, transistor TR2 can be connected to a number of different SCR arrangements such as a full wave control arrangement, a multiple control arrangement or a series operation arrangement by means of a pulse transformer having a suitable number of D.C. isolated windings connected to the SCR gate electrodes.

Since pulses are generated to trigger the SCR, no problems need arise from temperature variations, since the height of the pulses applied to the gate electrode of the SCR can be adjusted to provide reliable operation under the most adverse conditions (lowest SCR operating temperature and lowest B+).

If compensation for line voltage changes that directly affect the load is desired, a voltage dependent resistor (VDR) may be added to the phase shift network of FIGURE 1. Feedback control from the load may be used when the load is a device such as a motor where constant speed is desirable.

While it is desirable to bias transistor TR1 so that only the negative-going pulses of waveform C1 are amplified by transistor TR1, transistor TR1 could be biased so as to amplify the whole of waveform C1. This is not a preferred mode of operation, however, because by amplifying both the positive-going and negative-going pulses, the amplification of the negative-going pulses is less than what it could be if only the negative-going pulses were amplified. When the resultant signal E1 produced by this mode of operation is applied to transistor TR2, negative-going pulses in waveform E1 will be blocked by transistor TR2, so that only positive-going pulses will be supplied to the gate electrode of SCR 13. Alternatively, transistor TR2 could be removed and a clamping diode employed to prevent negative-going pulses in waveform E1 from being applied to the gate electrode of SCR 13. Of course, this latter arrangement only should be employed with an SCR that would not unduly load transistor TR1. If the loading were too high, the signal applied to the gate electrode of SCR 13 would not have a large enough amplitude to trigger the SCR, although, in this event, it might be possible to increase the gain of transistor TR1 by varying B+ and the values of components such as resistors R4 and R5.

While preferred embodiments of this invention have been disclosed herein, those skilled in the art will appreciate that changes and modifications may be made therein without departing from the spirit and scope of this invention as defined in the appended claims.

What I claim as my invention is:

1. A circuit for supplying a controllable current to a load comprising: a transformer having a primary winding and a secondary winding; a silicon controlled rectifier having anode, cathode and gate electrodes; a load to which said controllable current is to be supplied; said load being connected to said silicon controlled rectifier; means for supplying an A.C. voltage to said silicon controlled rectifier in phase lock with the A.C. voltage developed across said secondary winding when said primary winding is connected to an A.C. power source; and a trigger circuit for controlling the magnitude of said current supplied to said load, said trigger circuit comprising: a phase shift network producing an output signal shiftable in phase by 180° and having positive and negative portions thereof on both sides respectively of a reference axis, said phase shift network including said secondary winding; a clipping network for clipping the positive and negative-going peaks of said output signal to produce a clipped output signal, said clipping network having an input terminal and an output terminal; means connecting said phase shift network and said input terminal for supplying said output signal of said phase shift network to said clipping network to be clipped; and a network connected between said output terminal and said gate electrode for differentiating said clipped output signal, blocking negative-going pulses from said gate electrode and supplying a differentiated signal having positive-going pulses to said gate electrode.

2. A circuit according to claim 1 wherein said phase shift network also includes a terminal at a reference potential, a first capacitor and a variable resistor, and wherein said secondary winding has a centre tap, said first capacitor and said variable resistor being connected in series circuit with each other, the maximum resistance of said resistor being substantially greater than the impedance of said capacitor at the frequency of said A.C. voltage developed across said secondary winding, said series circuit being connected across said secondary winding, said centre tap being connected to said terimnal at said reference potential.

3. A circuit according to claim 1 wherein said clipping network comprises first and second diodes, said diodes being connected in inverse parallel with each other in full wave rectifier configuration.

4. A circuit according to claim 1 wherein said last-mentioned network includes a first differentiating network comprising the input resistance of a first transistor having base, collector and emitter electrodes, said second capacitor being connected between said output terminal of said clipping network and said base electrode, said first transistor being biased to amplify only the negative-going pulses of the differentiated signal produced by said differentiating network and being connected in phase inverting configuration.

5. A circuit according to claim 4 wherein said last-mentioned network also includes a second differentiating network having input and output terminals, a second transistor having base, collector and emitter electrodes and connected in emitter follower configuration, means connecting said collector electrode of said first transistor and said input terminal of said second differentiating network for supplying the signal derived at said collector electrode of said first transistor said second differentiating network to be further differentiated therein, means connecting said output terminal of said second differentiating network and said base electrode of said second transistor, and means connecting said emitter electrode of said second transistor and said gate electrode.

6. A circuit according to claim 5 wherein said second differentiating network includes a third capacitor and a first resistor, said third capacitor being connected between said collector electrode of said first transistor and said base electrode of said second transistor, said input terminal of said second differentiating network being connected between said third capacitor and said first resistor.

7. A circuit according to claim 2 wherein said clipping network comprises first and second diodes, each having anode and cathode electrode, said diodes being connected in parallel with each other in full wave rectifier configuration with said anode of said first diode and said cathode of said second diode both connected to both said input terminal and said output terminal of said clipping network and with said cathode of said first diode and said anode of said second diode both connected to said terminal at said reference potential.

8. A circuit according to claim 7 wherein said last mentioned network includes a first differentiating network comprising the input resistance of a first transistor having base, collector and emitter electrodes, said second capacitor being connected between said output terminal of said clipping network and said base electrode, said first transistor being biased to amplify only the negative-going pulses of the differentiated signal produced by said differentiating network and being connected in phase inverting configuration.

9. A circuit according to claim 8 wherein said last mentioned network also includes a second differentiating network having input and output terminals, a second transistor having base, collector and emitter electrodes and connected in emitter follower configuration, means connecting said collector electtrode of said first transistor and said input terminal of said second differentiating network for supplying the signal derived at said collector electrode of said first transistor said second differentiating network to be further differentiated therein, means connecting said output terminal of said second differentiating network and said base electrode of said second transistor, and means connecting said emitter electrode of said second transistor and said gate electrode.

10. A circuit according to claim 9 wherein said second differentiating network includes a third capacitor and first resistor, said third capacitor being connected between said collector electrode of said first transistor and said base electrode of said second transistor, said input terminal of said second differentiating network being connected between said third capacitor and said first resistor.

References Cited

UNITED STATES PATENTS

| | | | |
|---|---|---|---|
| 3,165,688 | 1/1965 | Gutzwiller | 307—88.5 |
| 3,184,672 | 5/1965 | Mason et al. | 307—88.5 |
| 3,218,511 | 11/1965 | Rosenbaum | 307—88.5 |

ARTHUR GAUSS, *Primary Examiner.*

JOHN S. HEYMAN, *Examiner.*